United States Patent [19]

Sebalos

[11] Patent Number: 4,757,300

[45] Date of Patent: Jul. 12, 1988

[54] BRAKE ADJUSTMENT MONITORING DEVICE FOR AUTOMOTIVE VEHICLES

[76] Inventor: Adam Sebalos, 140 Charles St., Jersey City, N.J. 07307

[21] Appl. No.: 750,514

[22] Filed: Jul. 1, 1985

Related U.S. Application Data

[63] Continuation-in-part of Ser. No. 443,241, May 2, 1984, Pat. No. 4,583,071.

[51] Int. Cl.$^4$ ............................................. B60Q 1/00
[52] U.S. Cl. .............................. 340/52 B; 340/52 A; 188/1.11; 116/208; 116/204
[58] Field of Search ................. 340/52 A, 52 B, 52 R, 340/69; 335/205, 207; 200/83 L, 82 E;81.9 M; 188/1.11; 116/208, 204

[56] References Cited

U.S. PATENT DOCUMENTS

| | | |
|---|---|---|
| 1,513,230 | 5/1925 | Hope . |
| 2,087,386 | 7/1937 | Norton . |
| 3,260,820 | 7/1966 | O'Brien .................... 200/81.9 M |
| 3,297,985 | 1/1967 | Trebonsky et al. .................... 340/69 |
| 3,298,466 | 1/1967 | Ayers ..................... 188/1 |
| 3,321,045 | 5/1967 | Veilleux .................... 188/1 |
| 3,339,676 | 9/1967 | Quinn ..................... 188/1 |
| 3,585,327 | 6/1971 | Farmery ................... 200/83 |
| 3,982,614 | 9/1976 | Bisaillon .................... 192/30 W |
| 3,998,295 | 12/1976 | Martin .................... 188/1.11 |
| 4,231,012 | 10/1980 | Voland .................... 340/52 A |
| 4,279,214 | 7/1981 | Thorn .................... 188/1.11 |
| 4,513,184 | 4/1985 | Hughes .................... 200/81.9 M |
| 4,583,071 | 4/1986 | Sebalos et al. .................... 340/52 B |

Primary Examiner—John W. Caldwell, Sr.
Assistant Examiner—Tyrone Queen

[57] ABSTRACT

A brake adjustment monitoring device of use on motor vehicles to warn the operators when the brakes are in need of adjustment or repair. A magnet is adjustably secured to the brake shaft connected to an existing brake air chamber assembly. A magnetically sensitive switch which is electrically connected to a wear signaling device is mounted on a rod proximate to the brake shaft at a predetermined distance from the magnet, so as to close the switch by magnetic flux when the shaft of the air chamber moves outward too far after the operator touches the brake pedal of the vehicle. The switch when closed energizes the wear signaling device, such as a buzzer and bulb, to alert the operator that the brakes are in need of adjustment. The improved device includes a sliding magnet—switch spacing gauge, which presets the predetermined distance that the magnet, which is mounted to move with the brake shaft, travels before it reaches the magnetically sensitive switch to close the switch and energize the wear signaling device. An interlocking spacing gauge is provided to quickly set the position of the mounting plate and rod holding the switch—housing block combination, with respect to the magnet. The magnet and block combination is formed with a plurality of openings through the body of the block and with a removable wedge piece to permit mounting of the magnet housing block combination at various positions along the brake shaft or yoke.

7 Claims, 5 Drawing Sheets

BRAKE ADJUSTMENT MONITORING DEVICE FOR AUTOMOTIVE VEHICLES

This application is a continuation-in-part of pending application, Ser. No. 06/443,241, filed 05/02/84 now U.S. Pat. No. 4,583,071, the filing date of which is hereby claimed for the common subject matter under 35 U.S.C. 120.

FIELD OF THE INVENTION

This invention relates to safety devices, and more particularly, to a brake adjustment monitoring device for automotive vehicles.

SUMMARY OF THE INVENTION

The principal object of this invention is to provide a brake adjustment monitoring device for automotive vehicles, which will be employed on trucks, buses, and the like, so as to prevent unnecessary accidents which occur daily, because mechanics did not, or could not examine the brakes of the vehicles to see if they required adjustments.

It is well known in the art that a driver may test the brakes of his vehicle prior to going on the road, but if the brakes of the vehicle are almost out of adjustment, he will not find out until he urges down against the brake pedal and finds they the brakes do not work. Break failure, in most cases, is simply brake wear to the point where the brake shoes fail to press against the drum due to the maximum length the air brake shaft can travel.

Another object of this invention is to provide a brake adjustment monitoring device for automotive vehicles which will enable the driver to have continuous monitoring of his vehicle's brakes, and if the adjustment shaft is reaching the point where the brakes should be adjusted, an indicator mounted on the dashboard in the cab, will flash a light.

Another object of this invention is to provide a brake adjustment monitoring device for automotive vehicles which will also include a sound emitting device which will be activated simultaneously with the indicator warning light.

A further object of this invention is to provide a brake adjustment monitoring device for automotive vehicles which will employ switch and circuit means that will not be adversely affected by weather conditions, which device alerts the driver before the brakes are inoperable, thus enabling the driver to cautiously continue his route and have the brakes adjusted and tested at the end of his run.

A still further object of this invention is to provide a brake adjustment monitoring device for automotive vehicles, which will be so designed, that it will be adaptable for use with various types of switch means.

An even further object of this invention is to provide a brake adjustment monitoring device for automotive vehicles which will also function when applying the parking brakes, without any modification of the existing brake system, and the device may be so designed so as to be installed on the interior of the air chambers of the vehicle brake system when the vehicle is manufactured.

Other objects of the invention are to provide a brake adjustment monitoring device for automotive vehicles, which will be simple in design, inexpensive to manufacture, rugged in construction and easy to install.

In an improved form of this invention, another object of this invention is to provide means for positioning and installing parts of the monitoring device without taking the brakes out of adjustment, thus saving time and labor costs in the installation of the device.

These and other objects will become readily understood upon a study of the specification and the accompanying drawings.

DESCRIPTION OF THE PREFERRED EMBODIMENTS

Accordingly, a device 10 is shown to include a mounting plate 11 which is provided with a pair of spaced-apart openings 12 and 13 for receiving threaded bolts 14 that extend from openings 14a through the end wall 15 of air chamber assembly 16. Plate 11 is also provided with a smaller diameter opening 11a which is spaced between openings 12 and 13, and is adjacent to a scored line 11b. The scored line 11b enables plate 11 to be easily broken off at one end, to adapt it to a differently designed air chamber which will have a second bolt 14 of a smaller diameter. A block 17 made of a suitable plastic material, includes a pair of set screws 18 on each side, which are threaded into openings 19, and the screws 18 serve to render block 17 secure to one of the bolts 14 at any angle and distance from end wall 15 of air chamber assembly 16, and a nut fastener 17a is received on the bolt 14 receiving block 17 so as to hold plate 11 down against end wall 15. A reed switch 20 is encapsulated within block 17, and its contacts 21 and 22 extend from the sides of block 17. Wire 23 of switch 20 connects with the ground 25 of the vehicle's circuit and wire 24 connects with one side of a bulb 26. The opposite side of bulb 26 connects to the positive terminal 27 of the vehicle's circuit, and the indicator unit 28 which includes a switch 20 and a bulb 26 for each of the vehicle's air chamber assemblies 16, is dashboard or otherwise mounted in the cab of the vehicle. A buzzer 29 is also included in the indicator unit 28, so as to give an audible indication to the operator simultaneously as a bulb 26 flashes when either of the switches 20 closes, as one side of the buzzer 29 connects to the vehicle's ground 25, and its opposite side connects by wires 30 to each of the wires 24 of bulbs 26.

Figures 1, 2, 3, 4, 5, 6, 7, 8, 9, 10:
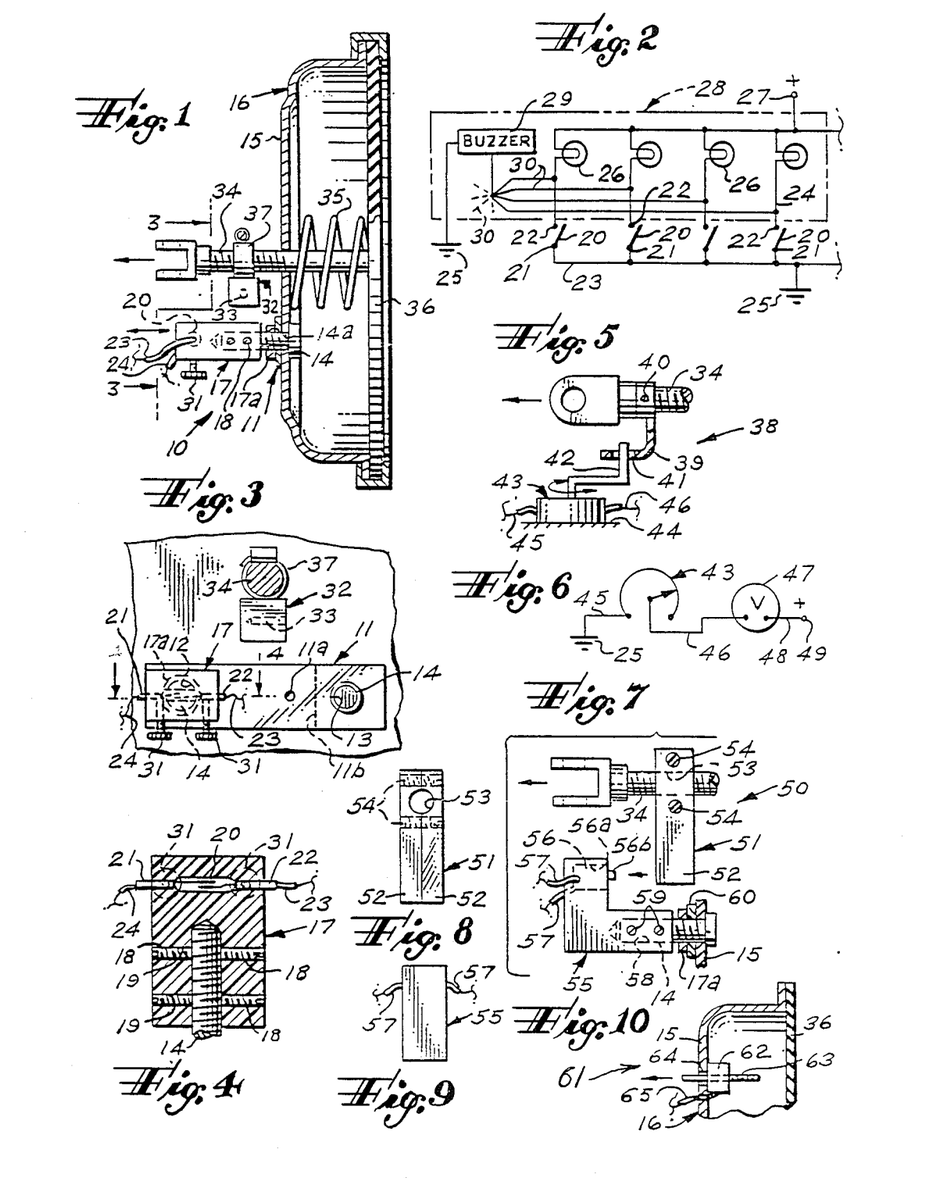
FIG. 1 is a vertical cross-sectional view of a typical brake air chamber showing the present invention installed thereon and illustrating the mounting plate of the sensor in section and the diaphragm of the chamber is shown partly broken away.
FIG. 2 is a fragmentary wiring diaphragm of the circuit of the invention which illustrates the dashboard or otherwise located indication display.
FIG. 3 is an enlarged cross-sectional view, taken along the line 3—3 of FIG. 1.
FIG. 4 is an enlarged cross-sectional view, taken along the line 4—4 of FIG. 3.
FIG. 5 is a side view of a modified form of the invention shown in elevation.
FIG. 6 is a schematic wiring diaphragm of FIG. 5.
FIG. 7 is a side view of another modified form of switch shown in elevation.
FIG. 8 is a side view of the contact arm shown in elevation and removed from FIG. 7.
FIG. 9 is a left end view of the micro-switch arm, shown in elevation and removed from FIG. 7.
FIG. 10 is fragmentary view of FIG. 1 shown in elevation and illustrating still another modified form of the invention.

A pair of set screws 31 are also received in block 17, so as to render the contacts 21 and 22 of switch 20 secure, and a second block 32 of suitable plastic material encapsulates a permanent magnet 33 which cooperates with reed switch 20 through magnetic flux to close switch 20 when shaft 34, having spring 35 and the attached diaphragm 36, moves outward a distance of approximately two and a quarter inches which is the point where the brake needs adjustment or repair. An adjustable clamp 37 is fixedly secured to one side of second block 32 in a suitable manner, not shown, and is received on shaft 34, so as to render block 34 secure thereto and clamp 37 enables the magnet 33 and its block 32 to be properly positioned on shaft 34 for the effective operation of switch 20.

In operation, when the operator of the vehicle touches the brake with his foot, the diaphragm 36 urges its attached shaft 34 outwards, and if its travel is approximately two and a quarter inches, the magnet 33, being moved to close proximity with switch 20, will cause switch 20 to close, and the bulb 26 secured in that particular circuit of switch 20 will light to give the operator indication. When the above-mentioned occurs, the buzzer 29 will also be activated.

It shall also be recognized, that device 10 is further unique because when the operator or mechanic applies the parking brakes, the device 10 will also give him indication at the unit 28 without any modification to the vehicle's existing brake system.

Referring now to FIGS. 5 and 6 of the drawing, a modified device 38 is shown to include an arm 39, which is secured to shaft 34 of chamber assembly 16, by a set screw 40. An enlongated opening 41 through the extending end of arm 39 freely receives the extending end of lever shaft 42 of a rheostat 43 which is suitably secured to a mounting plate 44 that is mounted to a bolt 14 of air chamber assembly 16 in a manner similar to that heretofore described of plate 11 of device 10. One of the wires is secured to the vehicle's ground 25 and the other wire 46 is secured to one side of a voltmeter 47. The opposite side of voltmeter 47 is secured by wire 48 to a positive terminal 49 of the vehicle's circuit.

In operation, when the operator of the vehicle touches the brake pedal with his foot, the shaft 34 moves outward by its attached diaphragm 36 and the arm 39 rotates lever shaft 42 of rheostat 43 which will cause meter 47 to indicate by increased voltage means.

Referring now to FIGS. 7, 8 and 9, another modified device 50 is shown to include a contact arm 51, which is composed of a pair of plates 52. A semi-circular opening 53 in one face of each plate 52 aligns with each other to be received on the shaft 34 of air chamber assembly 16, and a pair of screw fasteners 54 are threadingly received in plates 52, so as to adjustably render contact arm 51 secure to shaft 34 for cooperation with block 55 containing a micro switch 56. Block 55 is fabricated of a suitable plastic material, and mircoswitch 56 is fixedly secured in opening 56a in a suitable manner, and its button 56b extends therefrom for engagement with contact arm 51 when the brake associated therewith needs adjustment. The extending wires 57 of switch 56 are wired into indicator unit 28 in place of one of the heretofore described switches 20 of device 10. The opposite end of block 55 receives one of the bolts 14 of air chamber assembly 16, in its opening 58, and block 55 is adjustably fastened to bolt 14 by means of a pair of set screws 59. A mounting plate 60 is received on bolts 14 of end wall 15 of air chamber assembly 16, in the same manner, as was heretofore described of block 17 of device 10.

In use, modified device 50 functions in the same manner as was described for device 10, with the exception that a contact arm 51 serves to directly strike the button 56b of mirco-switch 56 to provide indication through the cab mounted indicator unit 28.

Looking now at FIG. 10, a further modified device 61 is shown to include a micro-switch 62 which is fixedly secured to the inside face of end wall 15 of air chamber assembly 16 in a suitable manner not shown. The button shaft 63 of switch 62 is threaded, so as to be adjustable, and is freely received in opening 64 of end wall 15 and is activated by contact with diaphragm 36. The wires 65 of micro-switch 62 extend from a second opening through end wall 15, and are wired into the indicator unit 28 in place of a switch 20.

In use, the function of device 61 is similar to the heretofore described switches 20 and 50 with the exception that micro-switch 62 is internally mounted within air chamber assembly 16 and is closed by contact of the button shaft 63 with the diaphragm 36 when it travels too far inward.

All of the above forms of the invention illustrated in FIGS. 1 through 6 require taking the brakes out of adjustment, also known as "backing off" in order to set the positions of the magnetically sensitive or reed switch 20 and magnet 33 with respect to each other. As the distance that the brake shaft 34 can travel outward from the air chamber assembly 16 before brake adjustment is necessary varies between 1 inch (2.5 cm.) and 2½ inches (6.3 cm.) depending on the size of the brakes as determined by the manufacturer of the brake system, it was necessary to manually measure the place along the brake shaft at which to secure the magnet with respect to the reed switch. It was further necessary to manually adjust the position of the mounting plate 11 so that the reed switch block 17 mounted thereon would be at the proper angle and distance from the magnet to come within the field of force of the magnet at the point that the brakes needed adjustment. In the improved form of this invention, shown generally in FIGS. 11 through 21, an interlocking spacing gauge 80 is provided to set the position of the mounting plate holding the switch and block combination with respect to the magnet and block combination and a sliding magnet-switch spacing gauge 93 permits the required longitudinal distance between the magnet and switch along the brake shaft to be set without making manual measurements with a ruler, both gauges being easy to install and remove without taking the brakes out of adjustment. Further improvements are provided with respect to the means for adjustably securing the switch and block combination to a mounting rod 76 extending outwardly from the mounting plate 11 and the means for attaching the magnet and switch combination to appropriate positions along the brake shaft to simplify the installation of the device.

Figures 11, 13:
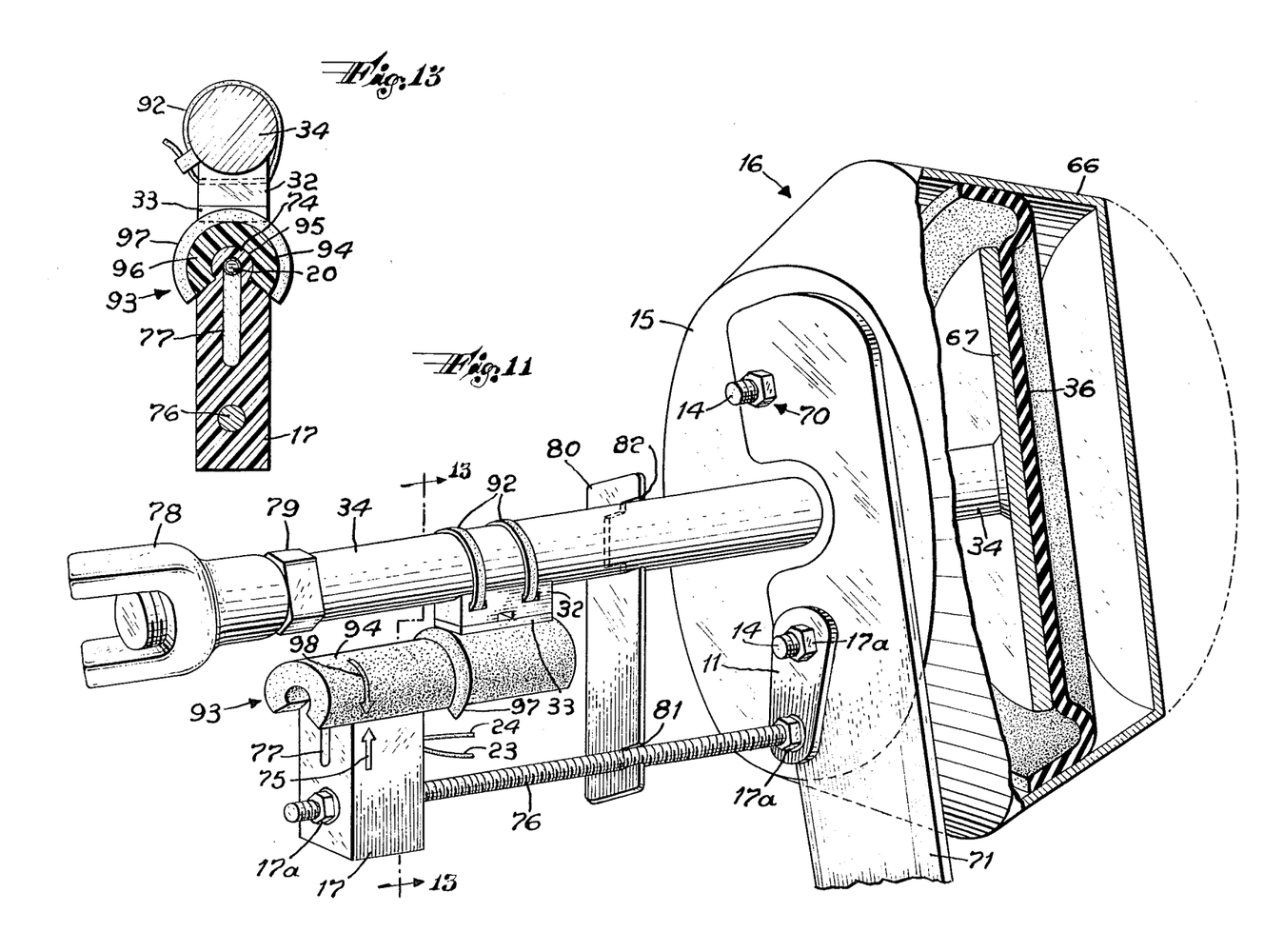
FIG. 11 is a perspective view of an improved form of the invention with parts of the air chamber assembly in cross-section.
FIG. 13 is a sectional view along line 13—13 of FIG. 11.
Figures 12, 14:
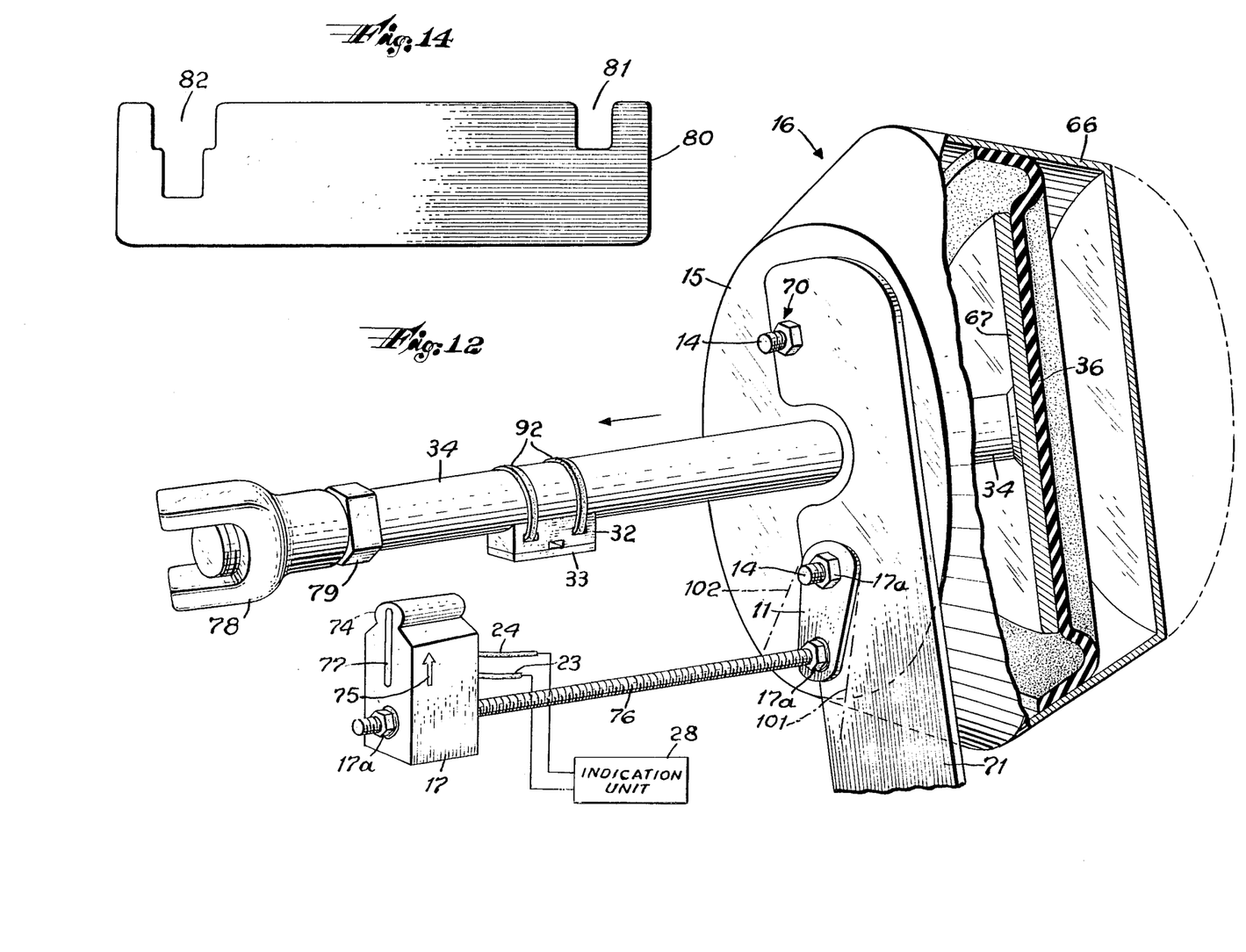
FIG. 12 is a perspective view of the improved form of the invention with two spacing gauges removed and parts of the air chamber assembly in cross-section.
FIG. 14 is a plan view of the interlocking spacing gauge.

As shown in FIGS. 11 and 12, a diaphragm 36 is engaged against a piston 67 to which a shaft 34 is welded in an air pressure chamber 66. The end wall 15 of the air pressure chamber assembly 16 is mounted on an existing mounting bracket 71 by means of an existing mounting stud 14 and nut fastener 70. When a driver of the vehicle steps on the brake pedal, air pressure pushes against diaphragm 36 and causes the piston 67 and the shaft 34 to move outward from air chamber 16. The far end of the shaft 34 is secured to a yoke 78 by a jam nut 79. The yoke 78 is connected to a slack adjuster (not shown) and thereafter by means well understood in the art to the brake drum assembly.

A mounting plate 11, formed with two openings 12, 13, is adjustably secured to the existing mounting bracket 71 by means of a mounting stud 14 and jam nut 17a through opening 13. The plate is mounted to lay against the mounting bracket 71. A threaded mounting rod 76 to support the reed switch 20 and block 17 combination is secured to the mounting plate 11 through opening 12 by jam nut 17a, the rod being mounted at substantially a right angle to the mounting plate and extending outwardly substantially parallel to the brake shaft 34. Other securing means can be used.

The switch block 17 is formed with an opening 73 through the body to receive the mounting rod 76 and the walls of the block opening 73 may be formed with threads 69 to cooperate with the threads on the mounting rod 76. The block is then fixed in a predetermined position with respect to the brake shaft by turning the block along the rod and securing it at the desired position by means of jam nuts 17a above and below the opening in the block, or by other securing means.

Figure 15:
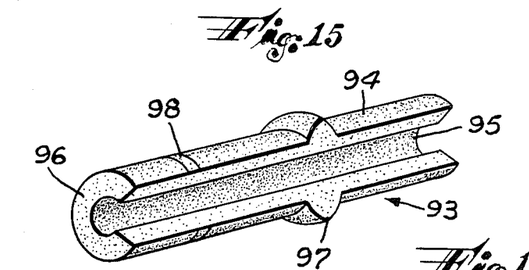
FIG. 15 is a perspective view of the magnet-switch spacing gauge.
Figures 20, 21:
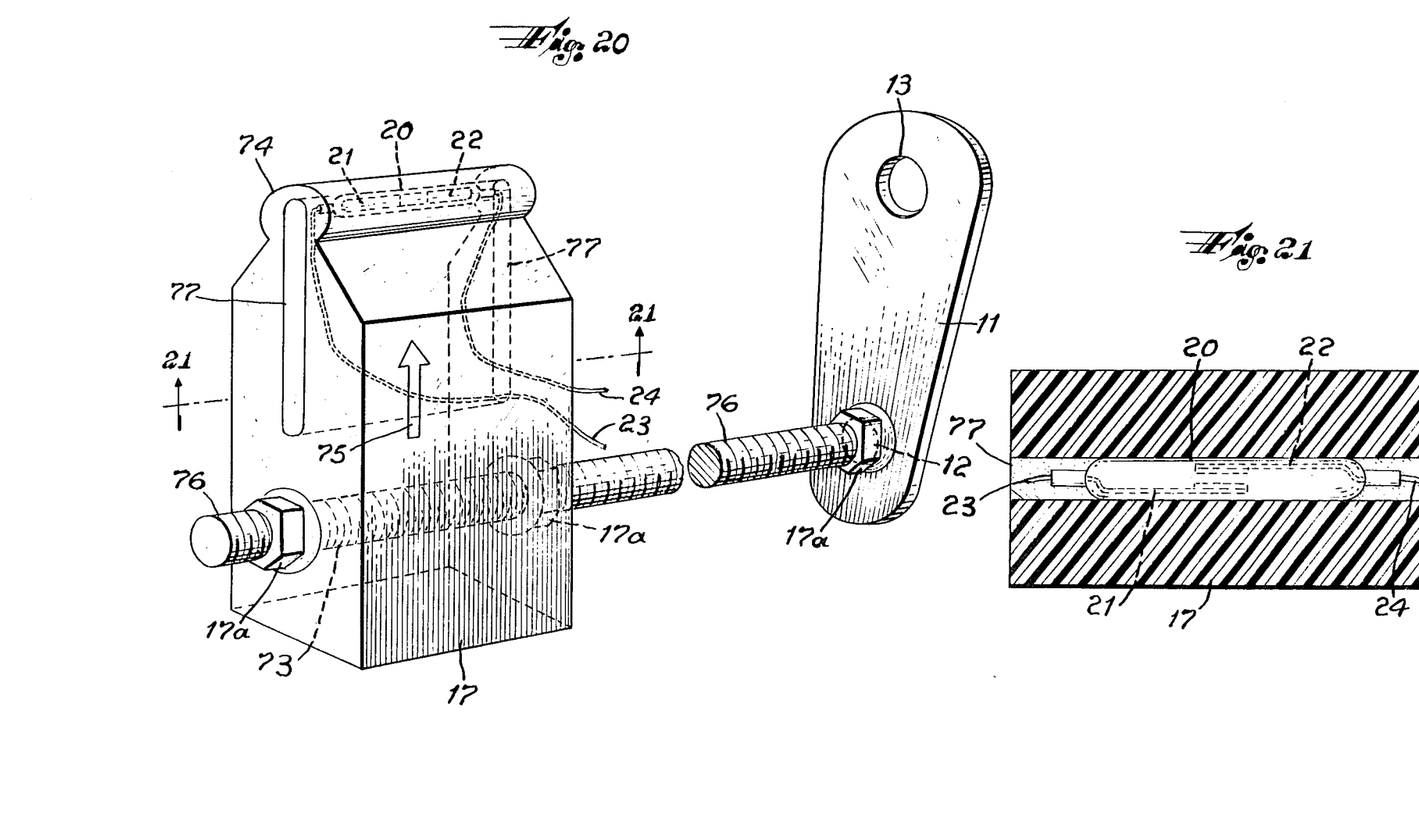
FIG. 20 is an enlarged perspective view of the improved switch and block combination.
FIG. 21 is a sectional view along line 21—21 of FIG. 20.

The body of the switch block 17 is formed with a hollow protuberance 74 at one end which is formed to contain the reed switch 20 and to cooperate with a magnet-switch spacing gauge 93 described below. An indicator mark or arrow 75 is formed on a side wall of the switch block 17 to indicate the point along the body of the reed switch 20 where the contacts 21, 22 of the reed switch will come within the field of force of the magnet to activate the switch, which indicator mark is also for use with the magnet-switch spacing gauge 93 described below.

To reduce the vibration of the reed switch 20 within the housing, which vibration can damage or destroy the switch, the switch block 17 may be formed with a cavity 77 opening into the space surrounding the reed switch 20, as shown in FIG. 20. The cavity 77 is filled with an inert gel-like material, such as silicon sealer material, which remains soft under most conditions and which serves to cushion the reed switch 20 against external vibration.

In order for the magnet 33 to operate the reed switch 20 in accordance with this invention, it is necessary for the switch-block combination 17 to be held at a predetermined parallel distance from the magnet. The position of the switch-block combination 17 is determined by the angle at which the mounting plate 11 is secured to the existing mounting bracket on the brake assembly, the angle varying in accordance with the dimension of the particular brake system in the vehicle. The angles 101 and 102, shown in FIG. 12, are shown for illustration of the possible positions of the mounting plate 11 to vary the position of switch block combination 17 with respect to the brake shaft 34. To save assembly time, an interlocking spacing gauge 80 is provided which holds the mounting rod 76 in the desired position with respect to the brake shaft 34 while the mounting plate 11 is being fixed into position. The interlocking spacing gauge 80 is formed of a strip of rigid material, such as plastic. Two slots 81, 82 are formed along one edge of the strip, the size or dimensions of the slots being predetermined to receive the mounting rod 76 and brake shaft 34, respectively. The longitudinal distance between the slots 81 and 82 is predetermined in accordance with the dimensions of the existing brake system, so that when the mounting rod 76 and brake shaft 34 are inserted into their respective slots the mounting plate 11 will be positioned to hold the mounting rod 76 in the desired position with respect to the brake shaft 34. Accordingly, the interlocking spacing gauge 80 is fitted onto the mounting rod 76 and shaft 34 before the jam nut 17a holding the mounting plate 11 to the existing mounting bracket 71 on the air chamber assembly is fully tightened. After the gauge 80 is in position, the jam nut 17a is tightened, thereby fixing the mounting plate 11 at the desired angle with respect to the end wall of the air chamber, which in turn places the mounting rod 76 in the desired position with respect to the brake shaft 34. After the mounting plate is fixed in position, the gauge may be removed.

A sliding magnet-switch spacing gauge 93 is provided to set the magnetic switch block 17 at the required longitudinal distance from the magnet block 52 without pulling the brakes out of adjustment. The distance which the brake shaft 34 moves outward from the air pressure chamber assembly 16 when the brakes are applied increases as the brake lining wears down. The distance the shft 34 can move before adjustment is required varies between one inch (2.5 cm.) and 2½ inches (6.3 cm.) as predetermined by size of the brake and the manufacturer of the brakes. The previously described forms of this invention required that the distance between the magnet block mounted on the shaft and switch block be manually measured with a ruler in order that the magnet should reach the magnetically sensitive switch to close the circuit and activate the wear signaling indication unit 28 when the brakes were in need of adjustment.

The magnet-switch spacing gauge 93 comprises an elongated body member 94 formed with a channel 95 to receive the protuberant end of the magnetically sensitive switch block as described above, so as to permit sliding reciprocating movement of the protuberance of the switch block within the channel. The gauge 93 is formed with an external shoulder 97, which is proximate to one end of the body member 94, to rest on the top of the magnet block 32. The gauge is held in position by the movable engagement of the protuberance within the channel while the shoulder of the gauge is positioned against the top end of the magnet block. The shoulder 97 serves as an indicator of the position of the top of the magnet 33. An indicator mark 98 or arrow is etched or otherwise formed on the outer wall of the body member, a predetermined distance from the shoulder 97. The position of the indicator mark 98 is predetermined in respect to the shoulder 97 according to the distance the shaft 34 may move outward from the air chamber assembly before brake adjustment is required.

The setting of the magnetic switch block 17 on the mounting rod 76 is adjusted by means of lock nuts 17a so that the indicator mark 75 on the switch block 17 is aligned with the indicator mark 98 on the magnet switch spacing gauge 93. After the indicator marks have been aligned, the magnet-switch gauge is removed. As the brakes are applied and released, the brake shaft moves in and out of the air chamber assembly. When the brake lining has worn to the point where the brakes need adjustment, the magnet 33 will reach a point proximate to the reed switch 20, which causes the switch 20 to close through magnetic flux and thereby activates the wear signaling indication unit 28.

The magnet-switch spacing gauge 93 may be made of a suitable plastic material in the form of a semi-circular cylinder having a semi-circular channel 95 formed along its length. The thickness of the walls 96 of the cylinder sets the parallel distance between the magnetic switch block 17 and the magnet block 32 and is predetermined to permit the magnetic flux of the magnet to cooperate with the contacts 21, 22 of the reed switch 20. The longitudinal distance between the shoulder 97 and the indicator mark 98 along the body of the gauge will be predetermined according to the type of brake system in the vehicle and will vary between 1 inch (2.5 cm.) and 2½ inches (6.3 cm.). For greater utility, each magnet-switch gauge may be manufactured with a plurality of indicator marks 98, each mark at a predetermined distance from the shoulder as required by the particular brake system in a vehicle.

Figure 16:
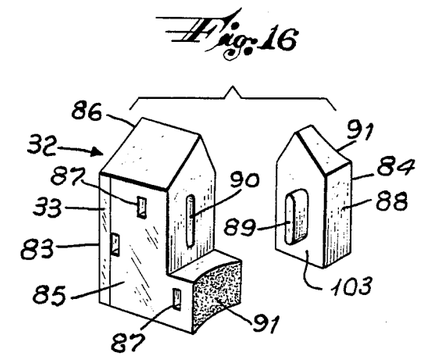
FIG. 16 is a perspective view of an improved magnet and block combination.
Figure 17:
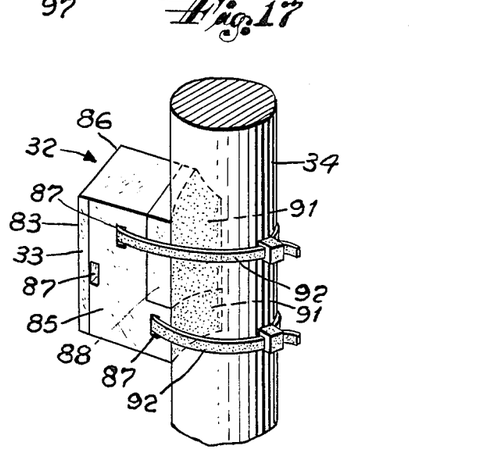
FIG. 17 is a perspective view of the magnet and block combination shown in FIG. 16 mounted on the brake shaft.
Figure 18:
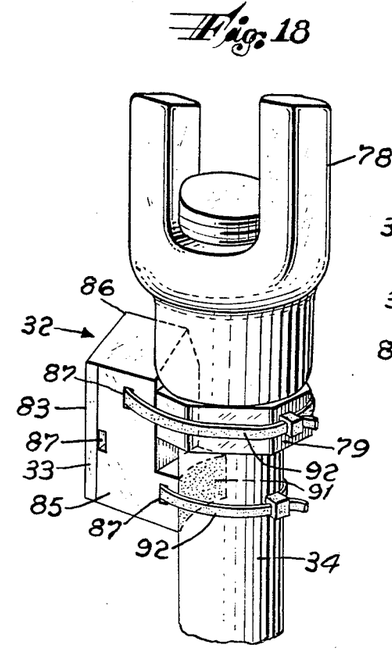
FIG. 18 is a perspective view of the magnet and block combination with wedge removed as mounted at lower shoulder of the yoke of the brake shaft.
Figure 19:
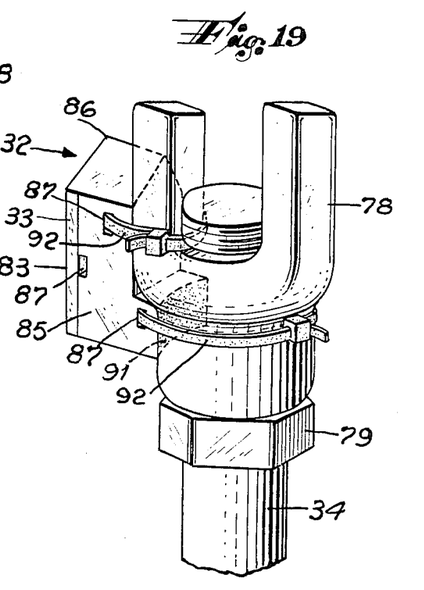
FIG. 19 is a perspective view of the magnet and block combination with wedge removed as mounted on the yoke of the brake shaft.

An improved magnet block combination 32 is provided to simplify the attachment of the magnet 33 to the brake shaft, to permit the block to be mounted on the yoke 78 of the brake shaft as well as on the shaft itself, and to provide a means of removing ice accumulations along the shaft as it moves. The magnet block 32 may be made of a suitable rigid plastic material. The block 32 is formed with a front wall 83, back wall 84, side walls 85 and top 86. Openings 87 are formed through the body of the block to receive straps, wire, tie wrap or similar securing means 92 to mount the block at the desired position along the shaft 34 or yoke 78. The top of the block may be formed as a peak 86 which assists in breaking ice accumulation near the brake shaft in winter. The magnet 33 is affixed to the front wall of the block. The back wall 84 of the block is coated with anti-slip material, such as grit 91 to help to secure the block in the desired position on the brake shaft or yoke. The upper back portion of the body of the block is formed with a removable wedge 88 as shown in FIG. 16. The inner face 103 of the wedge 88 which faces into the body of the block is formed with an outwardly extending key 89 which fits into a matching slot 90 formed within the body of the block, so that the wedge may be removed from the block or secured in place as required. As shown in FIG. 17, the wedge 88 is inserted in the magnet block assembly when the magnet block assembly is attached to the smooth surface of the brake shaft 34. However, as is understood by those skilled in the art, in some makes of brake systems, the distance of travel of the brake shaft is so small that the magnet must be mounted either on the jam nut 79 of the yoke 78 or on one of the arms of the yoke itself. In such cases, the removal of the wedge provides a clearance space so that the block can be mounted while maintaining the magnet in a substantially parallel position with respect to the reed switch 20. As shown in FIG. 18, the magnet and block combination 32 is mounted on the shaft 34 with the upper portion held against the lower shoulder of the yoke 78 and jam nut 79. In FIG. 19, the magnet and block combination 32 is mounted on only the yoke 78.

The foregoing is considered as illustrative only, and while specific embodiments have been described with some particularity, many modifications and variations of those embodiments will occur to those skilled in the art without deviating from the invention. Accordingly, it is to be understood that, within the scope of the appended claims, the invention may be practiced other than as specifically described or shown.

I claim:

1. A brake adjustment monitoring device comprising:
   (a) a mounting plate adjustably secured to an existing mounting bracket of an existing air chamber of a vehicle brake assembly, the mounting plate extending outwardly from the mounting bracket at a predetermined angle;
   (b) a mounting rod secured to the mounting plate at approximately a right angle to the plate, the rod extending parallel to the existing brake shaft;
   (c) a magnetically sensitive switch and block combination adjustably secured to the mounting rod;
   (d) a wear signaling indication unit electrically connected to the magnetically sensitive switch;
   (e) a permanent magnet and block combination secured to the existing brake shaft which is operatively connected in the air chamber of the brake assembly; and
   (f) a magnet-switch spacing gauge removably mounted on the magnet and block combination and the magnetically sensitive switch and block combination, the gauge being formed with a first indicator and a second indicator, the first indicator indicating the top of the magnet and the second indicator being positioned a predetermined distance from the first indicator and defining a predetermined distance between the magnet and the magnetically sensitive switch that the brake shaft must move outward from the air chamber to bring the magnet proximate to the magnetically sensitive switch to close the switch when the brakes are in need of adjustment, the gauge being of a predetermined thickness to preset a predetermined parallel distance between the magnetically sensitive switch and the magnet.

2. A brake adjustment monitoring device in accordance with claim 1 wherein
   (a) the magnetically sensitive switch and block combination is formed with a body portion having an opening therethrough to receive the mounting rod and formed with a hollow protuberance of predetermined size at one end of the body portion to receive the magnetically sensitive switch, the switch being in approximate alignment with the opening in the body portion, an indicator mark being formed on the side of the body portion proximate to the magnetically sensitive switch; and (b) the magnet-switch spacing gauge comprises an elongated body member formed with a channel to receive the protuberance of the switch body in slidable engagement for reciprocating movement, the first indicator being an external shoulder formed to rest at the top of the magnet block combination, the second indicator being a mark formed on the outer wall of the body member a predetermined distance from the shoulder.

3. A brake adjustment monitoring device in accordance with claim 2, wherein the magnet-switch spacing gauge is formed of a suitable rigid plastic material in the form of a semi-circular cylinder having a semi-circular channel along its longitudinal dimension and the protuberance of the magnetically sensitive switch body is formed with a predetermined semi-circular configuration for slidable engagement within the channel of the magnetic-switch spacing gauge.

4. A brake adjustment monitoring device in accordance with claim 1 including an interlocking spacing gauge to set the position of the mounting plate at a predetermined angle with respect to the end wall of the air chamber, comprising a strip of rigid material formed with two slots along one edge of the longitudinal dimension of the strip, with a predetermined distance between the slots, each slot being formed of predetermined size to receive the mounting rod and brake shaft, respectively, the gauge being removably fitted onto the mounting rod and brake shaft before the mounting plate is fully secured.

5. A brake adjustment monitoring device in accordance with claim 1 wherein the magnet and block combination comprises:

(a) a block of rigid material having a front wall, back wall, side walls and top;
(b) flexible securing means;
(c) a plurality of openings formed through the body of the block to receive the securing means to mount the block at a predetermined position along the brake shaft or yoke;
(d) a permanent magnet affixed to the front wall; and
(e) the upper back of the body of the block is formed as a removable wedge, the face of the wedge which faces into the body of the block being formed with an outwardly extending key and the body of the block being formed with a matching slot to receive the key.

6. A brake adjustment monitoring device in accordance with claim 5 wherein the top of the block is formed as a peak.

7. A brake adjustment monitoring device in accordance with claim 2 wherein the body portion of the magnetically sensitive switch and block combination is formed with a cavity in communication with the protuberance holding the switch, the cavity and space surrounding the switch in the protuberance being filled with an inert gel-like material.

* * * * *